(12) United States Patent
Stegawski et al.

(10) Patent No.: US 7,641,254 B2
(45) Date of Patent: Jan. 5, 2010

(54) CHASSIS FAIRING MOUNTING SYSTEM

(75) Inventors: Piotr Stegawski, Kirkland, WA (US);
Adam Grant Salnick, Seattle, WA (US);
Jake Tyler Ferderer, Bellevue, WA
(US); James Castner, Lake Forest Park,
WA (US); Byron C. Cook, Shoreline,
WA (US); Steven L. Baker, Duvall, WA
(US); Richard D. Wailes, Jr.,
Woodinville, WA (US)

(73) Assignee: PACCAR Inc, Bellevue, WA (US)

( * ) Notice: Subject to any disclaimer, the term of this patent is extended or adjusted under 35 U.S.C. 154(b) by 37 days.

(21) Appl. No.: 12/024,907

(22) Filed: Feb. 1, 2008

(65) Prior Publication Data

US 2008/0185869 A1  Aug. 7, 2008

Related U.S. Application Data

(60) Provisional application No. 60/887,743, filed on Feb. 1, 2007.

(51) Int. Cl.
*B62D 25/00* (2006.01)
(52) U.S. Cl. ................................ 296/35.1; 280/848
(58) Field of Classification Search .............. 280/848, 280/154, 851, 796; 296/35.1
See application file for complete search history.

(56) References Cited

U.S. PATENT DOCUMENTS

| | | | |
|---|---|---|---|
| 4,746,160 A | 5/1988 | Wiesemeyer | |
| 4,775,179 A | 10/1988 | Riggs | |
| 4,784,424 A | 11/1988 | Wiley, Jr. | |
| 4,817,976 A | 4/1989 | Kingsley | |
| 4,991,906 A | 2/1991 | Fingerle | |
| 5,098,116 A * | 3/1992 | Edahiro et al. | 280/5.524 |
| 5,609,384 A | 3/1997 | Loewen | |
| 5,921,617 A * | 7/1999 | Loewen et al. | 296/180.4 |
| 6,257,656 B1 * | 7/2001 | Cook et al. | 296/191 |
| 6,755,460 B1 * | 6/2004 | Marrs et al. | 296/187.12 |
| 6,896,318 B2 * | 5/2005 | Marrs et al. | 296/191 |
| 6,905,164 B2 * | 6/2005 | Marrs et al. | 296/191 |

* cited by examiner

*Primary Examiner*—Dennis H Pedder
(74) *Attorney, Agent, or Firm*—Christensen O'Connor Johnson Kindness PLLC

(57) ABSTRACT

A fairing assembly 100 is demountably coupled to a vehicle and includes a first and second support structure 112 and 122 fixedly secured to the vehicle. The fairing assembly 100 further includes a first support member 136 having first end coupled to the first support structure 112 and a second end coupled to the second support structure 122. A first elastic compression member 170 is positioned between the first end of the first support member 136 and the first support structure 112, and a second elastic compression member 170 is positioned between the second end of the first support member 136 and the second support structure 122. The first and second elastic compression members 170 impart opposing forces on the first support member 136 to position the first support member relative to the first and second support structures 112 and 122.

16 Claims, 20 Drawing Sheets

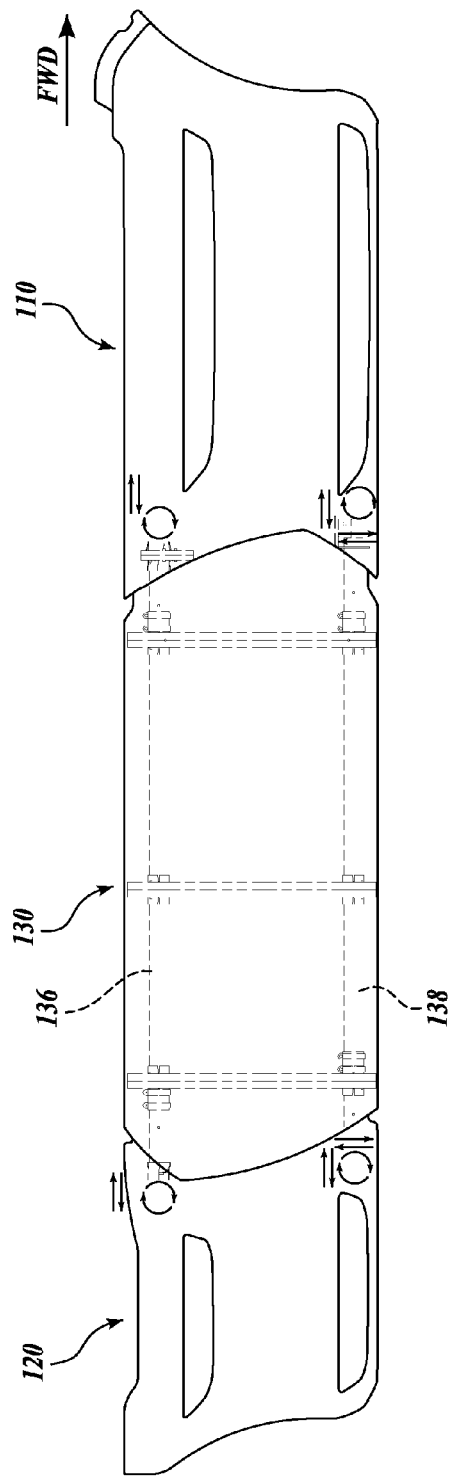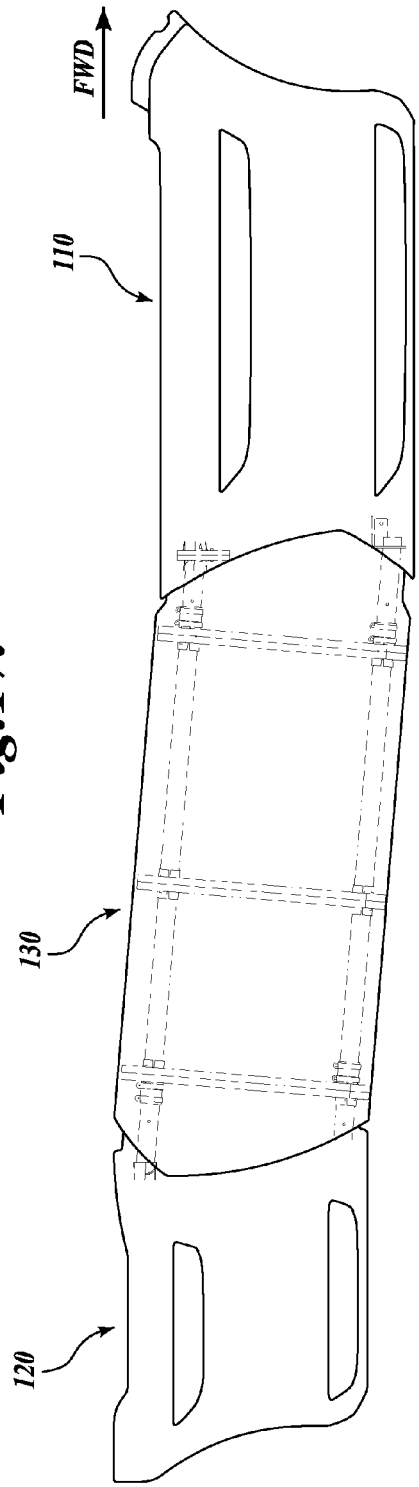
Fig.17.
Fig.18.

CHASSIS FAIRING MOUNTING SYSTEM

CROSS-REFERENCE(S) TO RELATED APPLICATION(S)

This application claims priority to U.S. Provisional Patent Application No. 60/887,743, filed Feb. 1, 2007, which is incorporated by reference herein.

BACKGROUND

Fairings are installed on vehicles for a number of reasons, including increasing aerodynamic efficiency, reducing noise, and improving the overall appearance of the vehicle. To achieve these goals, it is important that the fairings are properly located during installation. Mislocated fairings increase drag and noise. Mislocated fairings also result in inconsistent gaps between adjacent fairings that detract from the appearance of the vehicle. Accordingly, a mounting system that ensures proper fairing location is important to both the performance and the appearance of the vehicle.

Some heavy duty vehicles have a chassis fairing assembly that attaches to the vehicle frame rails and spans at least a part of the distance between the front and rear wheels. The chassis fairing assembly is made from several smaller fairing assemblies, including a forward fairing assembly, a center fairing assembly, and a rear fairing assembly. The forward, center, and rear fairing assemblies are each independently mounted to the chassis. As a result, the fairing assemblies must be adjusted to ensure that the fairings are properly located relative to each other in order to meet certain installation requirements, such as minimum and maximum gaps between the fairing assemblies. In addition to added labor, the adjustment process often requires special tools and mechanics with a certain level of training and experience.

SUMMARY

In a first embodiment of the disclosed fairing assembly, the fairing assembly is demountably coupled to a vehicle. The fairing assembly includes a first and second support structure fixedly secured to the vehicle. The fairing assembly further includes a first support member having first end coupled to the first support structure and a second end coupled to the second support structure. A first elastic compression member is positioned between the first end of the first support member and the first support structure. A second elastic compression member is positioned between the second end of the first support member and the second support structure. The first and second elastic compression members impart opposing forces on the first support member to position the first support member relative to the first and second support structures.

In an alternate embodiment of the disclosed fairing assembly, the fairing assembly is capable of being demountably coupled to a first and second support structure. The fairing assembly includes a first support member having a first end and a second end. The first end of the first support member is capable of coupling to the first support structure, and the second end of the first support member is capable of coupling to the second support structure. The fairing assembly further includes first and second elastic compression members associated with the first and second ends, respectively, of the first support member. When the first support member is coupled to the first support structure, the first elastic compression member is disposed between the first support member and the first support structure. When the first support member is coupled to the second support structure, the second elastic compression member is disposed between the first support member and the second support structure. The first and second compression members are adapted to impart opposing forces on the first support member to position the first support member relative to the first and second support structures when the first support member is coupled to the first and second support structures.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 17 is an inboard view of the chassis fairing assembly shown in FIG. 1 in an undeflected position;

FIG. 18 is an inboard view of the chassis fairing assembly shown in FIG. 1 in a deflected position;

DETAILED DESCRIPTION

Figure 1:
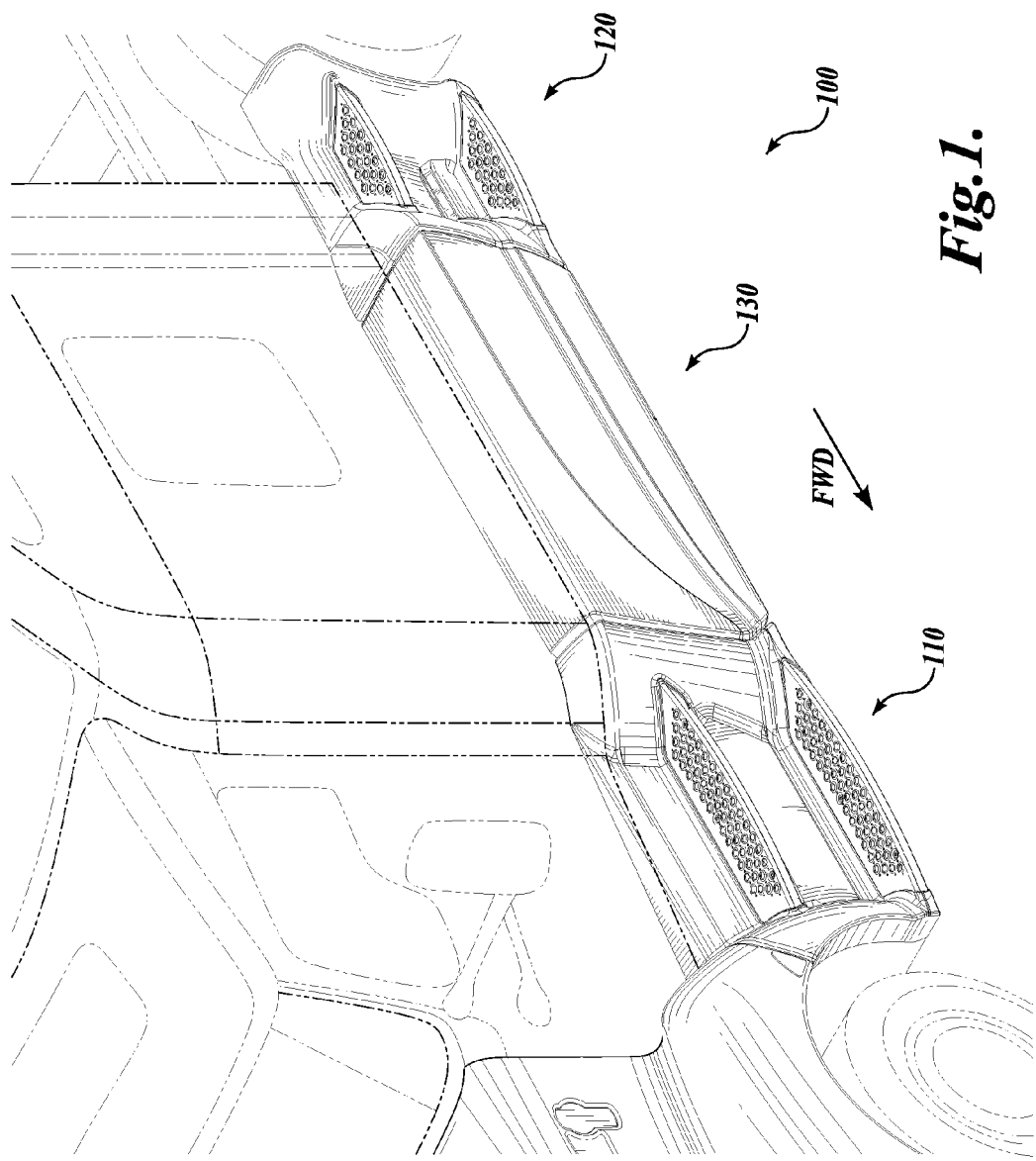
FIG. 1 is an outboard isometric view of an exemplary chassis fairing assembly constructed in accordance with one embodiment of the present disclosure.
Figure 2:
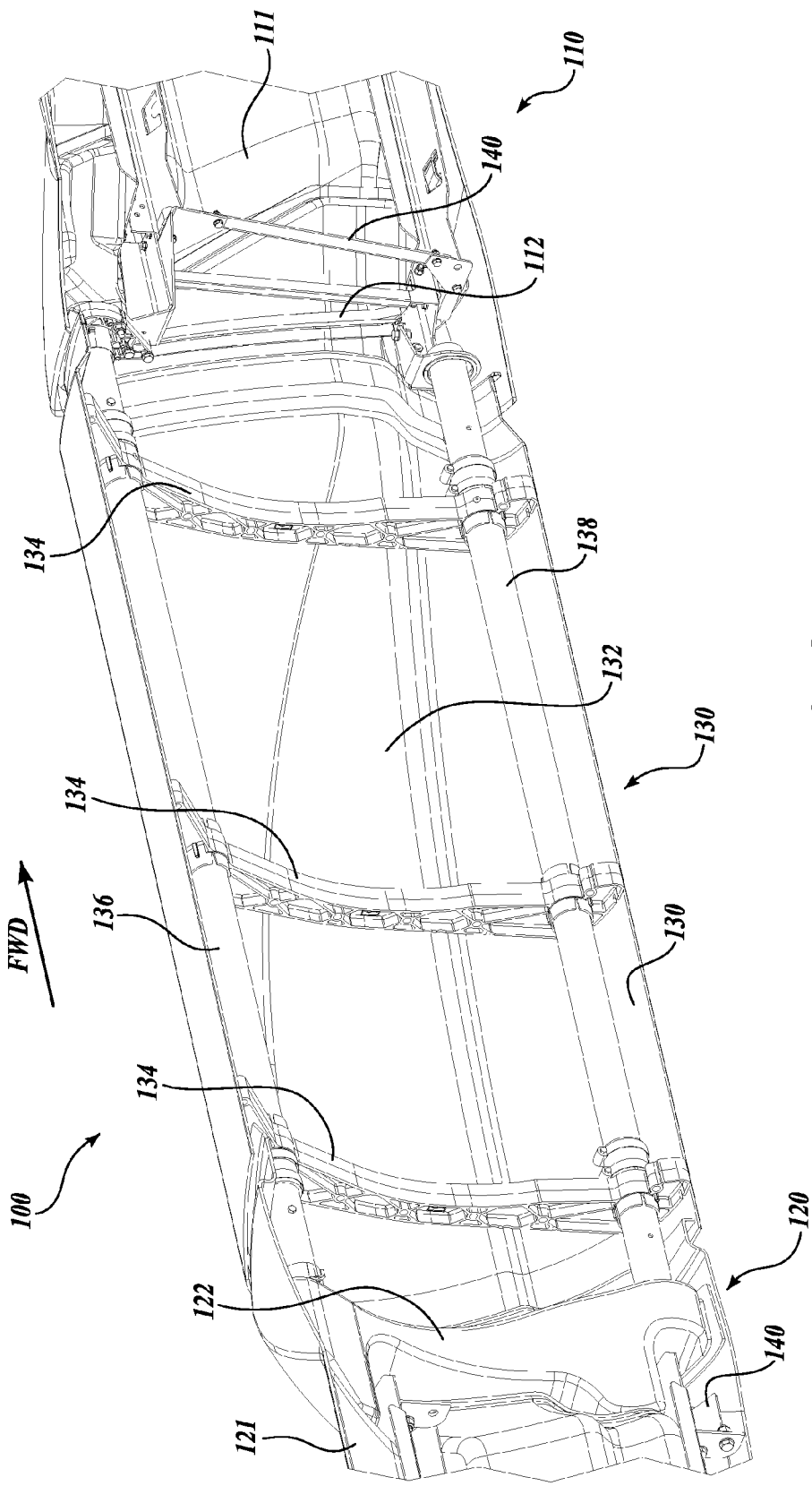
FIG. 2 is a partial inboard isometric view of the chassis fairing assembly shown in FIG. 1.

Referring to FIG. 1, a chassis fairing assembly 100 is mounted to a lower portion of a heavy duty vehicle chassis and extends along the side of the chassis in a generally horizontal direction between the vehicle axles. The chassis fairing assembly 100 includes a forward fairing assembly 110, a rear fairing assembly 120, and a center fairing assembly 130. As shown in FIG. 2, the forward fairing assembly 110 is positioned at the forward end of the chassis fairing assembly 100 and includes a forward fairing skin 111 fixedly attached to a forward fairing support structure 112. The forward fairing assembly 110 is mounted to the vehicle chassis by attaching the forward fairing support structure 112 to a chassis support structure 140, which is secured to the vehicle chassis. In the presently illustrated example, the chassis support structure 140 includes a battery box and step support; however it should be appreciated that any structural members fixedly secured to the chassis may be used.

The rear fairing assembly 120 is positioned at the rear end of the chassis fairing assembly 100 and includes a rear fairing skin 121 fixedly attached to a rear fairing support structure 122. Similar to the forward fairing assembly 110, the rear fairing assembly 120 is mounted to the chassis by attaching the rear fairing support structure 122 to the chassis support structure 140.

Figure 3:
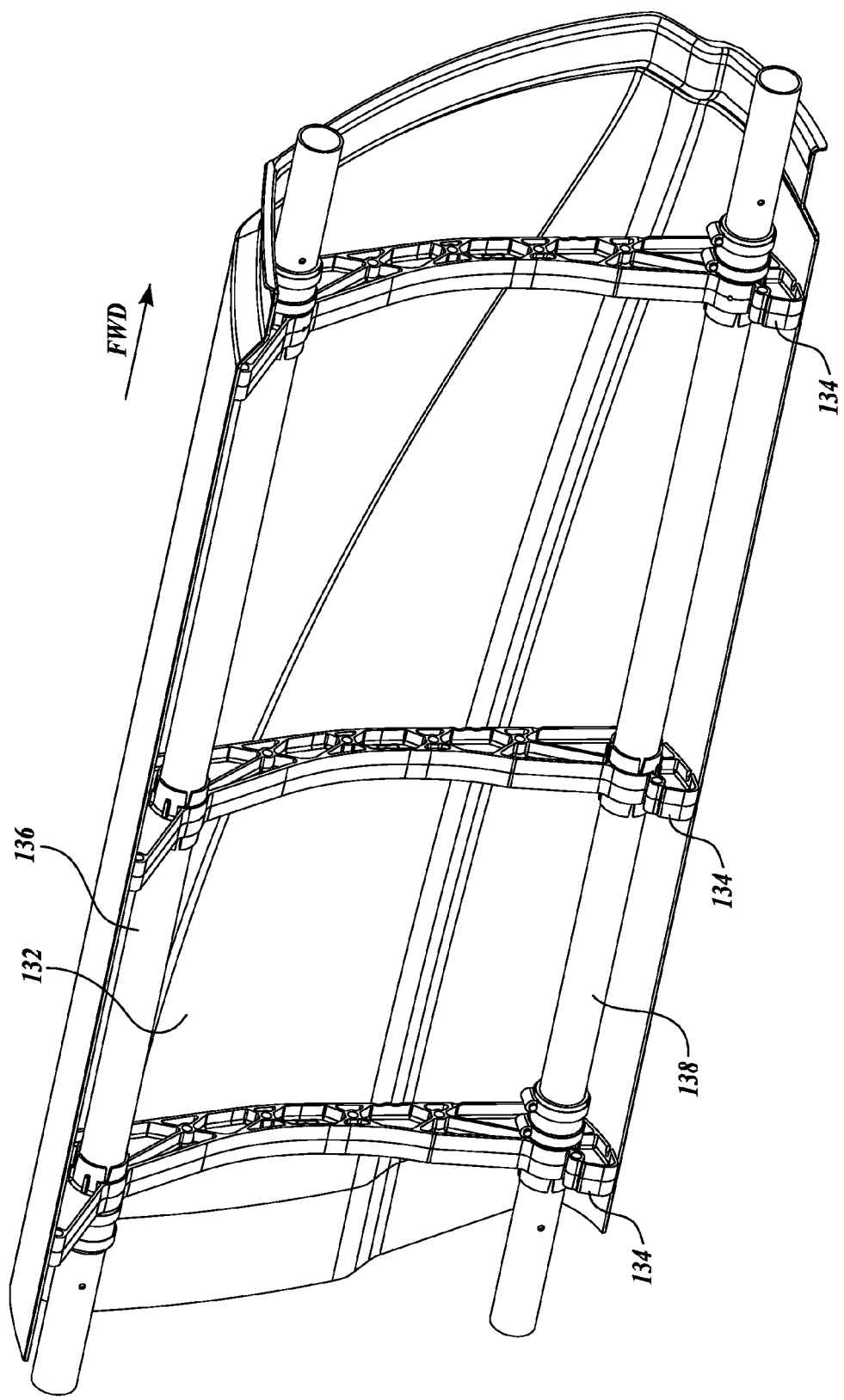
FIG. 3 is an inboard isometric view of the center fairing assembly of the chassis fairing assembly shown in FIG. 1.

Referring to FIGS. 2 and 3, the center fairing assembly 130 includes a fairing skin 132 with a plurality of structural ribs 134 attached to the inboard surface thereof. A substantially cylindrical upper support tube 136 is positioned adjacent to the upper edge of the fairing skin 132 and is coupled to the plurality of structural ribs 134 so that upper support tube 136 is restrained from moving in a forward and rearward direction relative to the center fairing assembly 130. The upper support tube 136 extends beyond the forward and rear edges of the fairing skin 132 and is in a generally horizontal position when the center fairing assembly 130 is installed. A substantially cylindrical lower support tube 138 is positioned adjacent to the lower edge of the fairing skin 132 and is coupled to the plurality of structural ribs 134 so that lower support tube 138 is restrained from moving in a forward and rearward direction relative to the center fairing assembly 130. Like the upper support tube 136, the lower support tube 13 extends beyond the forward and aft edges of the fairing skin 132 and is in a generally horizontal position when the center fairing assembly 130 is installed.

The support tubes 136, 138 have sufficient strength to support the center fairing assembly 130 under vehicle operating conditions. While the disclosed embodiment has two support tubes 136, 138, with each support tube positioned along the length of the center fairing assembly 130 and extending beyond the forward and rear edges of the center fairing skin 132, it should be appreciated that various embodiments, in which the number and orientation of the support tubes are varied, are within the scope of the disclosed subject matter. In one alternate embodiment, the center fairing assembly 130 has one or more additional support tubes located intermediate to the upper and lower support tubes 136, 138. In another alternate embodiment, the individual support tubes do not span the entire length of the center fairing assembly 130, but instead terminate at a location between the forward and rear ends of the fairing skin 132. Other alternate embodiments include support tubes 136, 138 that are not substantially cylindrical, but instead have cross-sections that are oval, square, rectangular, or of any other suitable configuration.

Figure 4:
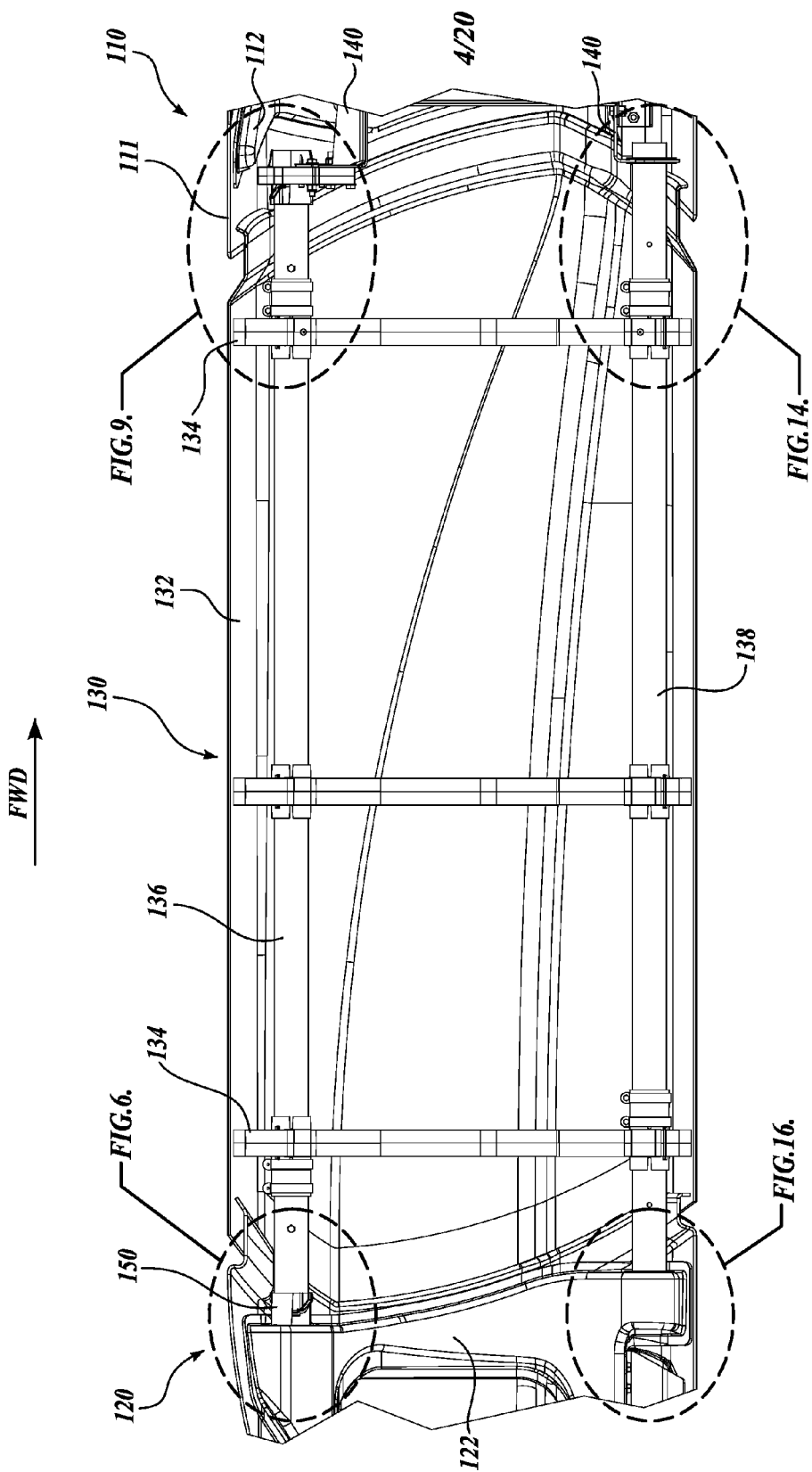
FIG. 4 is a partial inboard view of the chassis fairing assembly shown in FIG. 1.
Figure 5:
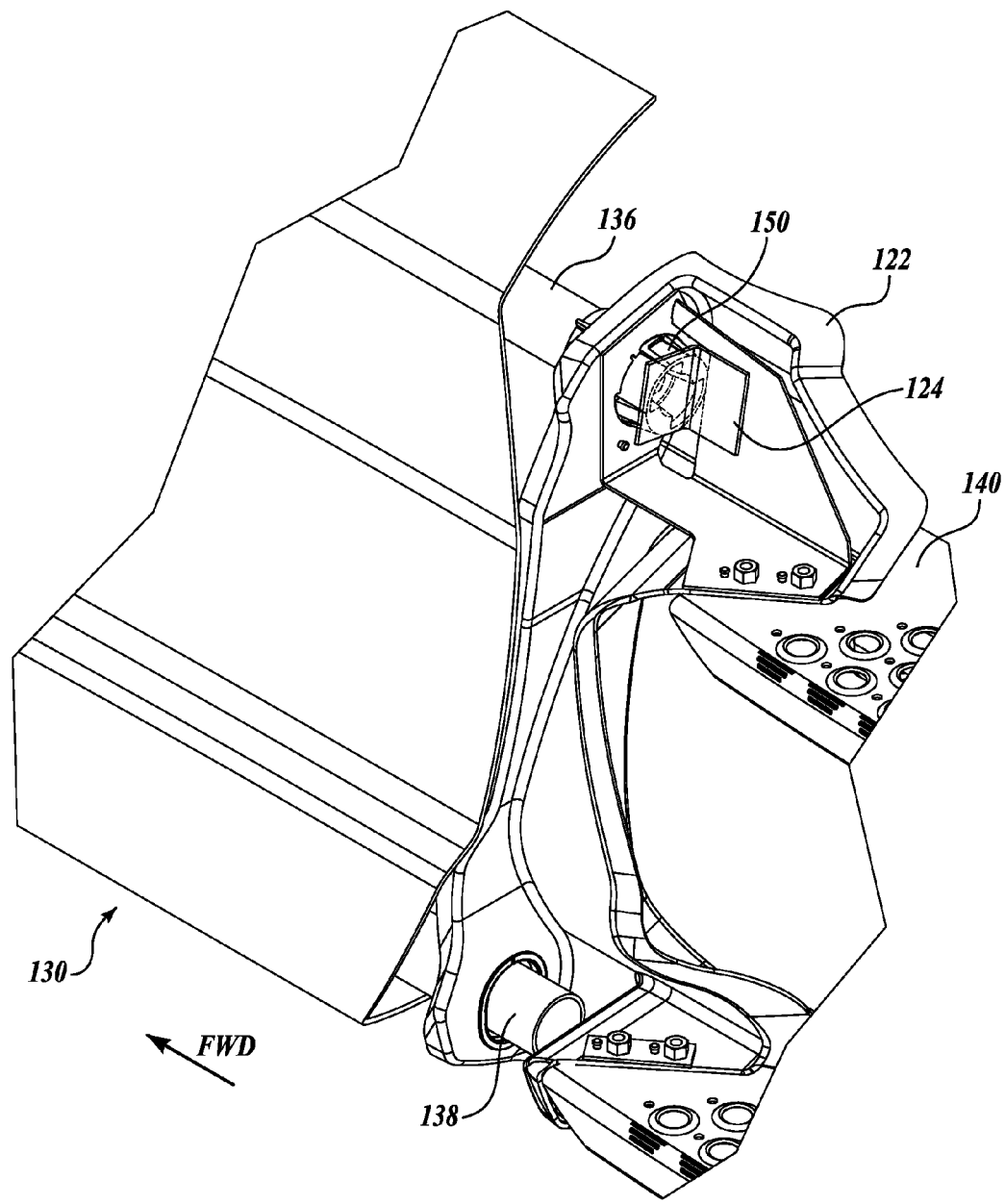
FIG. 5 is a partial outboard isometric view of the chassis fairing assembly shown in FIG. 1 with the rear fairing skin removed.

Referring to FIG. 4, the center fairing assembly 130 is supported between the forward fairing assembly 110 and the rear faring assembly 120 by the upper and lower support tubes 136, 138, which act as fairing support members. More specifically, the upper and lower support tubes 136, 138 are coupled to the chassis support structure 140 at the forward end of the center fairing assembly 130 and, as shown in FIG. 5, to the rear fairing support 122 at the rear end of the center fairing assembly 130.

Figure 6:
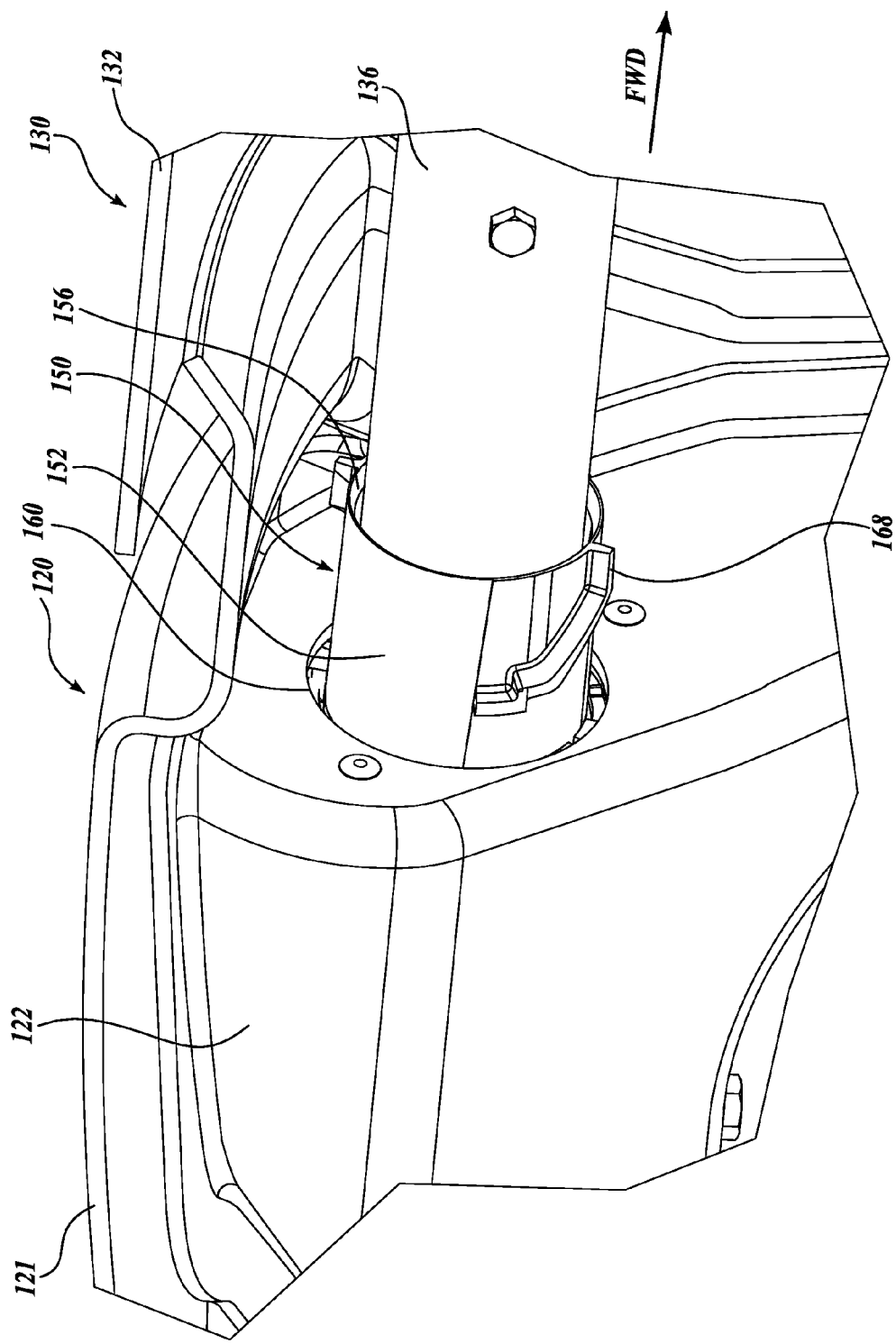
FIG. 6 is an inboard isometric detail view of the upper rear fairing attachment shown in FIG. 4.
Figure 7:
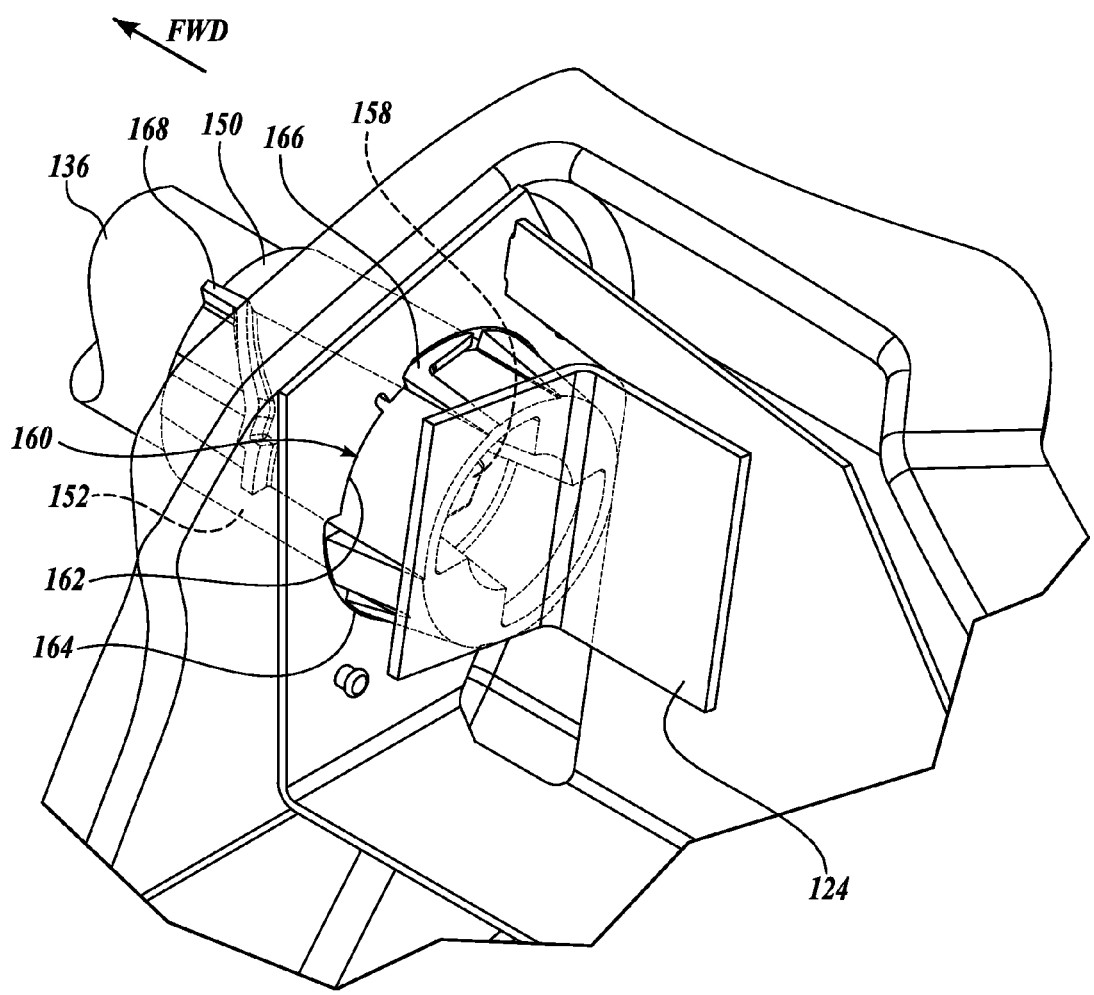
FIG. 7 is an outboard isometric view of the upper rear fairing attachment shown in FIG. 6.
Figure 8:
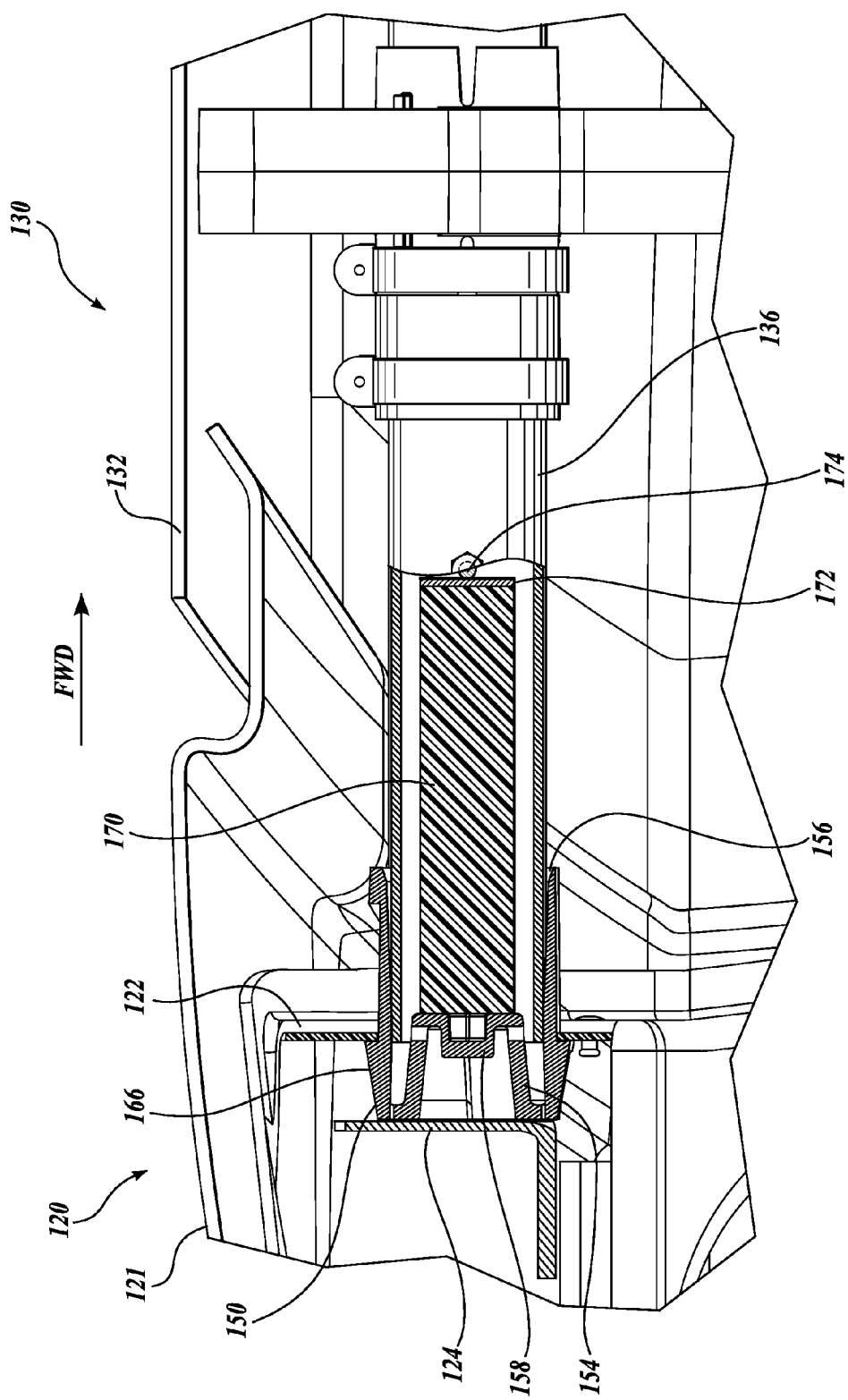
FIG. 8 is an inboard cross-sectional view of the upper rear fairing attachment shown in FIG. 6.
Figure 9:
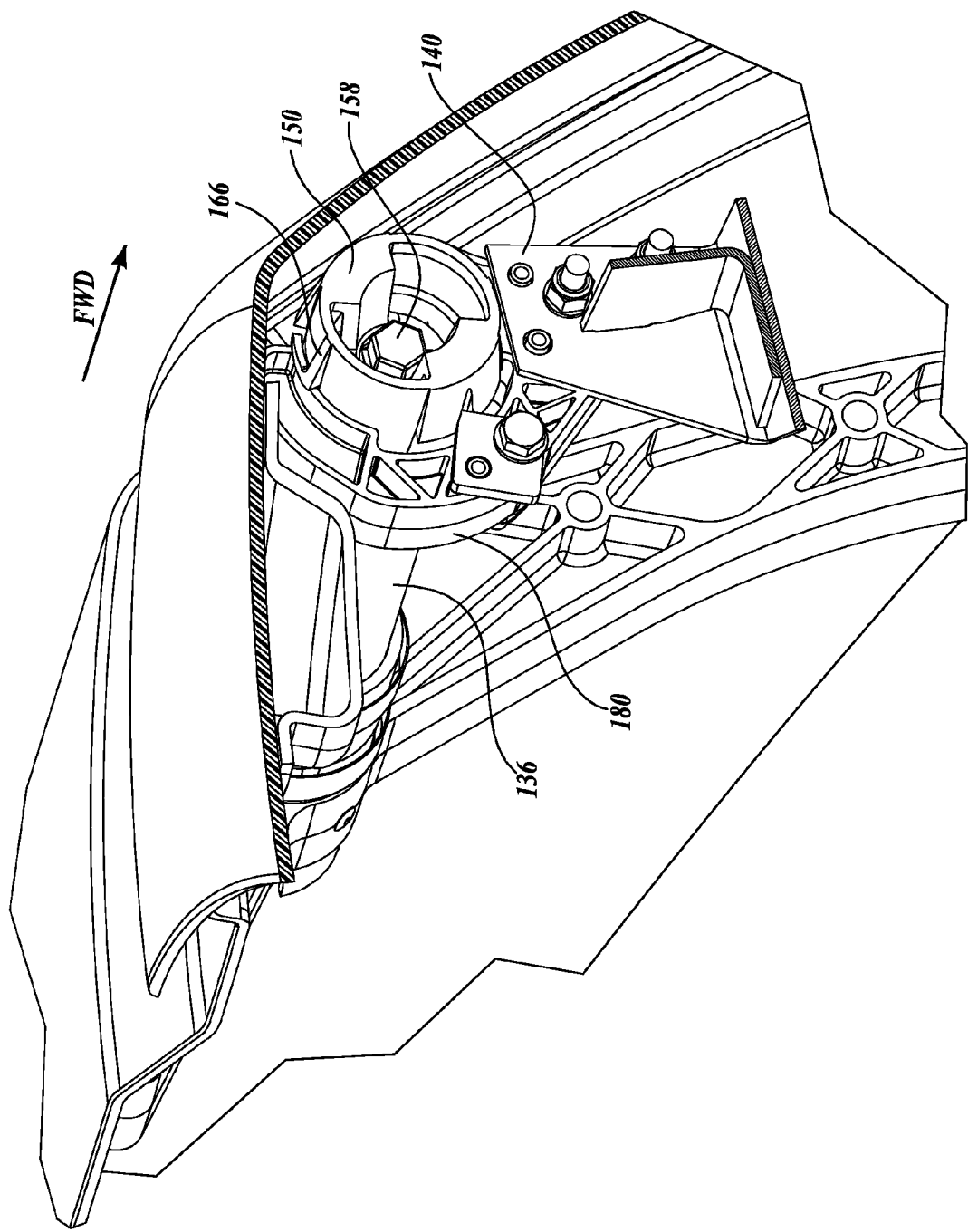
FIG. 9 is an inboard isometric view of the upper forward fairing attachment shown in FIG. 4.
Figure 10:
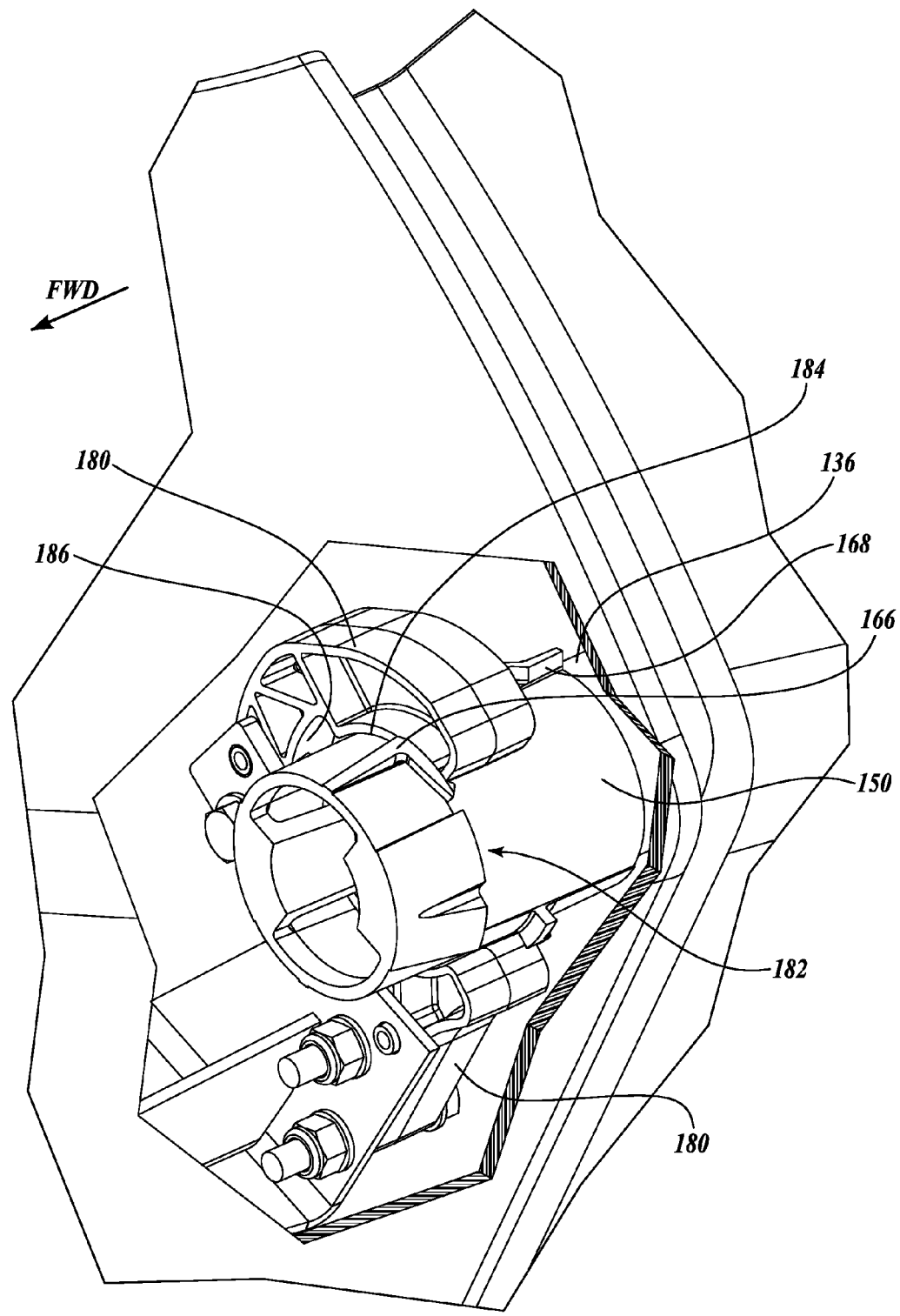
FIG. 10 is an outboard isometric view of the upper forward fairing attachment shown in FIG. 9.
Figure 11:
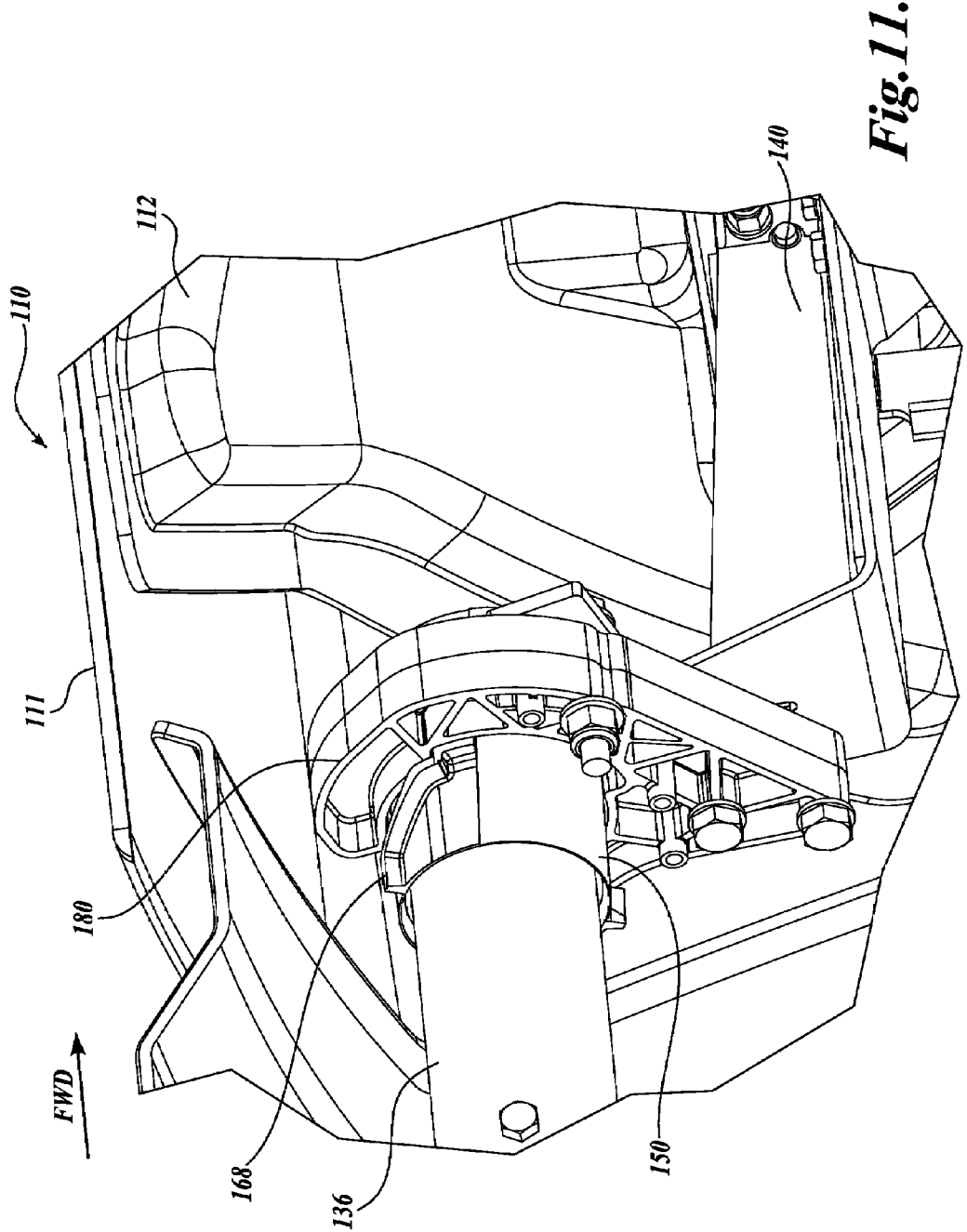
FIG. 11 is an inboard isometric view of the upper forward fairing attachment shown in FIG. 9.
Figure 12:
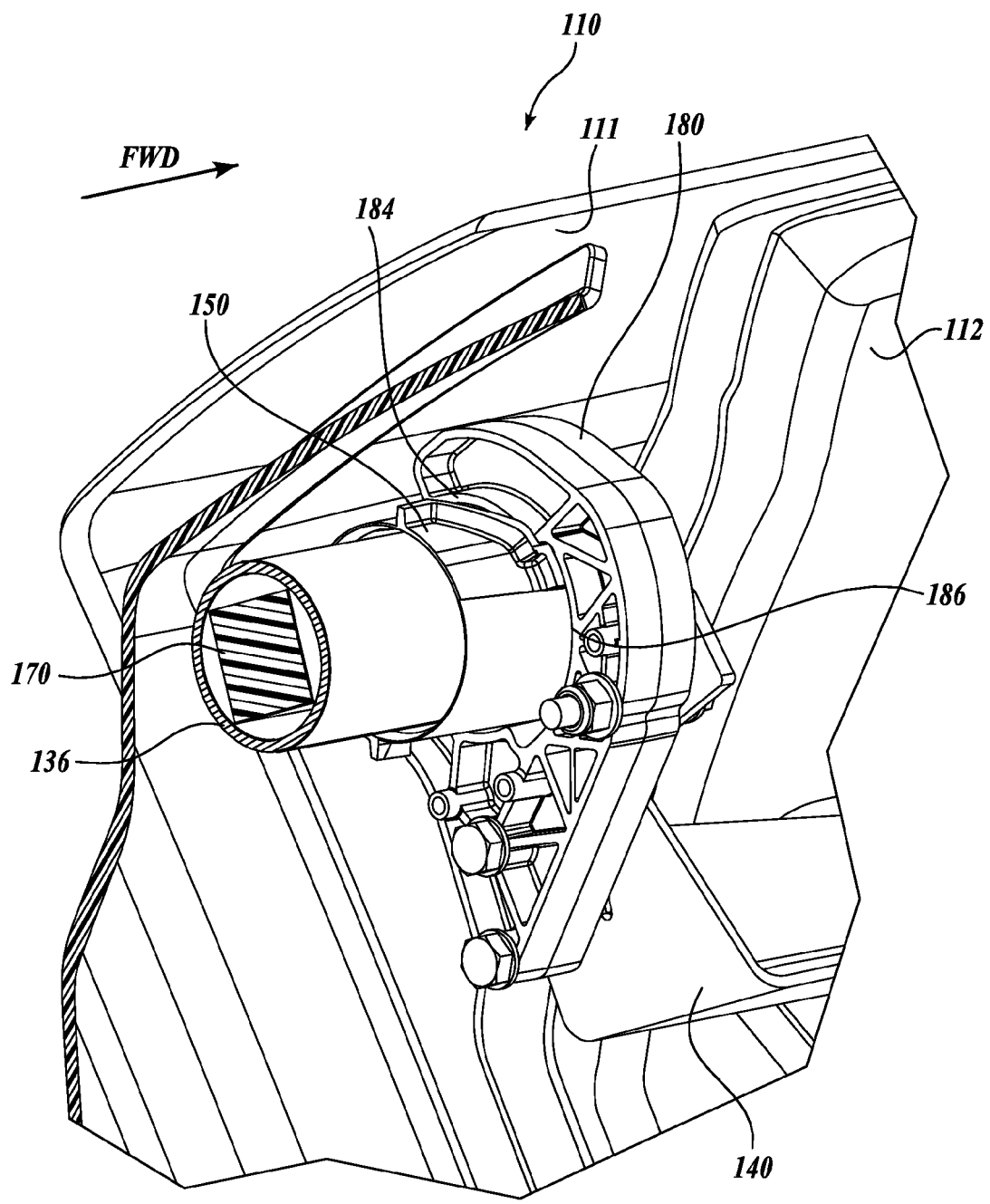
FIG. 12 is an inboard, isometric cutaway view of the upper forward fairing attachment shown in FIG. 9.

As best shown in FIGS. 6-8, the rear end of the upper support tube 136 is secured to the rear fairing support 122 with a retainer fitting 150. The retainer fitting 150 has a cylindrical body 152 and a cap 154 attached to a first end thereof. One or more first protrusions 166 protrude radially from the cylindrical body 152, extending from the first end of the cylindrical body 152 to a location intermediate to the first and second ends of the cylindrical body 152. One or more second protrusions 168 protrude radially from the cylindrical body 152, extending from the second end of the cylindrical body 152 to a point intermediate to the second end of the cylindrical body 152 and the first protrusions. The second end of the cylindrical body 152 has a cylindrical aperture 156 that is coaxial to the cylindrical body 152 and is sized to receive the upper support tube 136.

An aperture 160 to receive the retainer fitting 150 is located in the rear fairing support 122. As best shown in FIG. 7, the aperture 160 has one or more arcuate portions 162 and one or more recess portions 164 extending radially from the arcuate portions 162. The arcuate portions 162 have a radius larger than the radius of the cylindrical body 152 of the retainer fitting 150, but small enough to prevent the first protrusions 166 of the retainer fitting 150 from passing therethrough. In contrast, the recess portions 164 of the aperture 160 are sized and located to allow the first protrusions 166 of the retainer fitting 150 to pass therethrough. Accordingly, the retainer fitting 150 passes through the aperture 160 when the first protrusions 166 are aligned with the recess portions 164 of the aperture, but not when the first protrusions 166 are aligned with the arcuate portions 162 of the aperture 160. A retaining bracket 124 is fixedly positioned on the rear side of the aperture 160.

The retainer fitting 150 is secured to the rear fairing support 122 by positioning the retainer fitting 150 forward of the aperture 160 with the first protrusions 166 adjacent to and aligned with the recess portions 164 of the aperture 160. The retainer fitting 150 is moved rearward through the aperture 160 until the retainer fitting 150 contacts the retainer bracket 124. With the retainer fitting 150 contacting the retainer bracket 124, the retainer fitting 150 is rotated about its central axis so that the first protrusions 166 are aligned with the arcuate portions 162 of the aperture and not the recess portions 164 of the aperture 160. When the retainer fitting is so positioned, the retainer bracket 124 bears against the retainer fitting 150 to prevent the retainer fitting 150 from moving in a rearward direction. At the same time, the forward edges of the first protrusions 166 of the retainer fitting 150 bear against the rear surface of the fairing support 122 adjacent to the arcuate portions 162 of the aperture 160, thereby preventing the retainer fitting 150 from moving in a forward direction. In addition, the arcuate portions 162 of the aperture 160 bear against the sides of the retainer fitting 150 to restrain the retainer fitting 150 against movement in a radial direction.

FIG. 8 shows a cross-sectional view of the upper support tube 136 and the rear fairing support 122. The upper support tube 136 has a hollow portion at the rear end and a compression member 170 disposed therein. A retainer 172 is attached the forward end of the compression member 170, and a thru-bolt 174 is fastened to the upper support tube 136 so that the thru-bolt 174 passes through the hollow portion of the upper support tube 136 forward of the retainer 172. The thru-bolt 174 bears against the forward side of the retainer 172, preventing the retainer 172 and the compression member 170 from moving forward inside the upper support tube 136.

The cap 154 of the retainer fitting 150 has a concave cross-section that extends forward into the hollow portion of the upper support tube 136 and contacts the rear end of the compression member 170. As a result, when the upper support tube 136 is inserted into the cylindrical aperture 156 of the retainer fitting 150, the compression member 170 is compressed between the cap 154 of the retainer fitting 150 and the retainer 172 located in the upper support tube 136. The cap 154 has an optional hexagonal protrusion 158 located within the concave portion thereof to allow the retainer fitting 150 to be rotated with a standard socket fitting.

As best shown in FIGS. 9-13, the forward end of the upper support tube 136 is secured to the chassis support structure 140 with a support hook 180 and a retainer fitting 150, which is similar to the retainer fitting used to secure the rear end of the upper support tube 136 to the rear fairing support 122. The support hook 180 is fixedly attached to the chassis support structure 140 and has a generally C-shaped profile with a lateral opening 182 facing outboard. The lateral opening 182 is sized to receive the upper support tube 136 when the upper support tube 136 is in a generally forward/rearward orientation relative to the vehicle. The interior of the C-shaped profile has one or more arcuate portions 184 and one or more recess portions 186 similar to the aperture 160 in the rear fairing support 122. The arcuate portions 184 have a diameter larger than the diameter of the cylindrical body 152 of the retainer fitting 150, but small enough to interfere with the first and second protrusions 166, 168 of the retainer fitting 150. The recess portions 186 are sized and located so that the retainer fitting 150 passes through the interior of the C-shaped profile in an axial direction when the second protrusions 168 are aligned with the recess portions 186.

The retainer fitting 150 is secured to the support hook 180 by aligning the second protrusions 168 of the retainer fitting 150 with the recess portions 186 and the lateral opening of the support hook 180. The second end of the retainer fitting 150 is inserted into the interior of the C-shaped of the support hook 180 from the forward side of the support hook 180 so that the second protrusions 168 of the retainer fitting 150 are aligned with and pass through the recess portions 186 of the support hook 180. The retainer fitting 150 passes through the support hook 180 until the first protrusions 166 of the retainer fitting 150 contact the circular portion 184 of the support hook 180. With the first protrusions 166 of the retainer fitting 150 contacting the circular portions 184 of the support hook 180, the retainer fitting 150 is rotated about its central axis until the second protrusions 168 are no longer aligned with the recess portion 186s of the support hook 180. When secured as described, the first protrusions 166 bear against the forward side of the support hook 180, preventing the retainer fitting 150 from moving in the rearward direction. Similarly, the second protrusions 168 bear against the rear side of the support hook 180, preventing the retainer fitting from moving in the forward direction.

Figure 13:
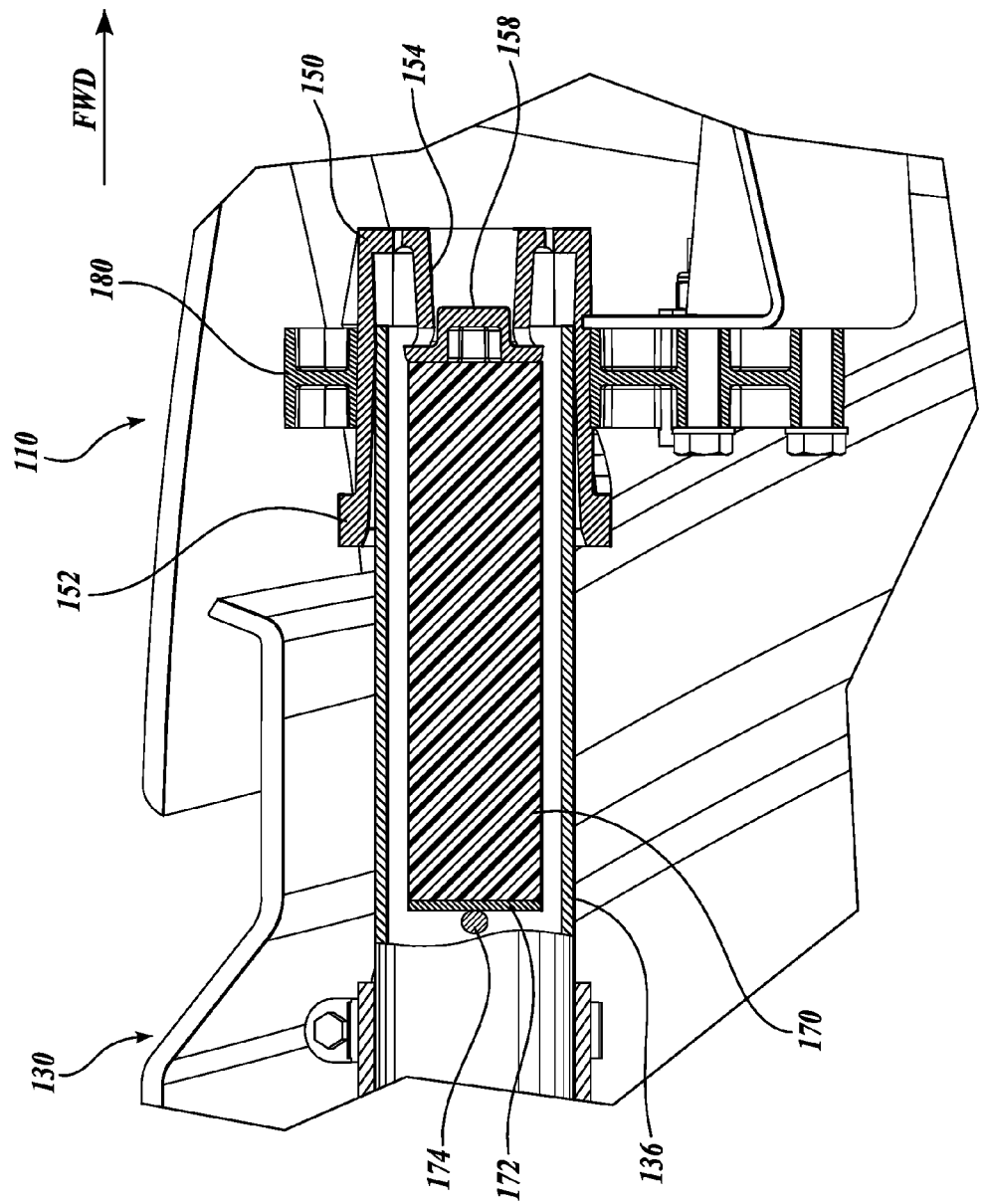
FIG. 13 is an inboard cross-sectional view of the upper forward fairing attachment shown in FIG. 9.

FIG. 13 shows a cross-sectional view of the upper support tube 136 and the support hook 180. Similar to the rear end of the upper support tube 136, a compression member 170 is disposed within a hollow portion of the forward end of the upper support tube 136. A retainer 172 is attached to the rear end of the compression member 170, and a thru-bolt 174 is secured to the upper support tube 136 so that the thru-bolt 174 passes through the hollow portion of the upper support tube 136 to the rear of the compression member 170 and retainer 172. The thru-bolt 174 bears against the retainer 172 to prevent the retainer 172 and the compression member 170 from moving rearward inside the upper support member 136.

To secure the upper support tube 136 to the chassis support structure 140, the support tube 136 is positioned within "C" portion of the support hook 180, and the support fitting 150 is inserted into the "C" portion of the support hook from the forward side of the support hook 180. The support fitting 150 is moved rearward so that the cylindrical aperture 156 of the retainer fitting 150 receives the forward end of the upper support tube 136. The retainer fitting 150 is moved rearward until the first protrusions 166 contact the support hook 180, at which time the retainer fitting 150 is rotated about its central axis to secure the retainer fitting 150 to the support hook 180.

The cap 154 of the retainer fitting 150 extends rearward into the hollow portion of the upper support tube 136 and contacts the compression member 170. As a result, when the upper support tube 136 is inserted into the cylindrical aperture 156 of the retainer fitting 150, the compression member 170 is compressed between the cap 154 of the retainer fitting 150 and the retainer 172 located in the upper support tube 136.

When the forward end upper support member 136 is secured to the chassis support structure 140 and the rear end of the upper support member 136 is secured to the rear fairing support 122 in the above-described manner, both ends of the upper support tube 136 are retrained against radial movement by the retainer fittings 150. Further, the upper support tube 136 is restrained from moving in the forward and rearward directions by the engagement of the compression members 170 with the caps 154 of the forward and rear retainer fittings 150.

The compression members 170 are preferably made from a polymer, such as urethane, having elastic properties such that they are slightly deformed with hand pressure. When installed, both compression members 170 are subject to an axial compression load. As a result, the upper support tube 136 translates in the forward or rear directions until the loads on the compression members 170 are equalized. The compression members 170 are sized and located so that when the loads on the compression members 170 are equal, the upper support tube 136, and therefore the center fairing assembly 130, is properly located relative to the forward fairing assembly 110 and the rear fairing assembly 120. As a result, once installed, the center fairing assembly 130 does not require adjustment because the upper support tube 136 moves forward or rearward to equalize the compressive stresses, thereby locating the center fairing assembly 130.

Figure 14:
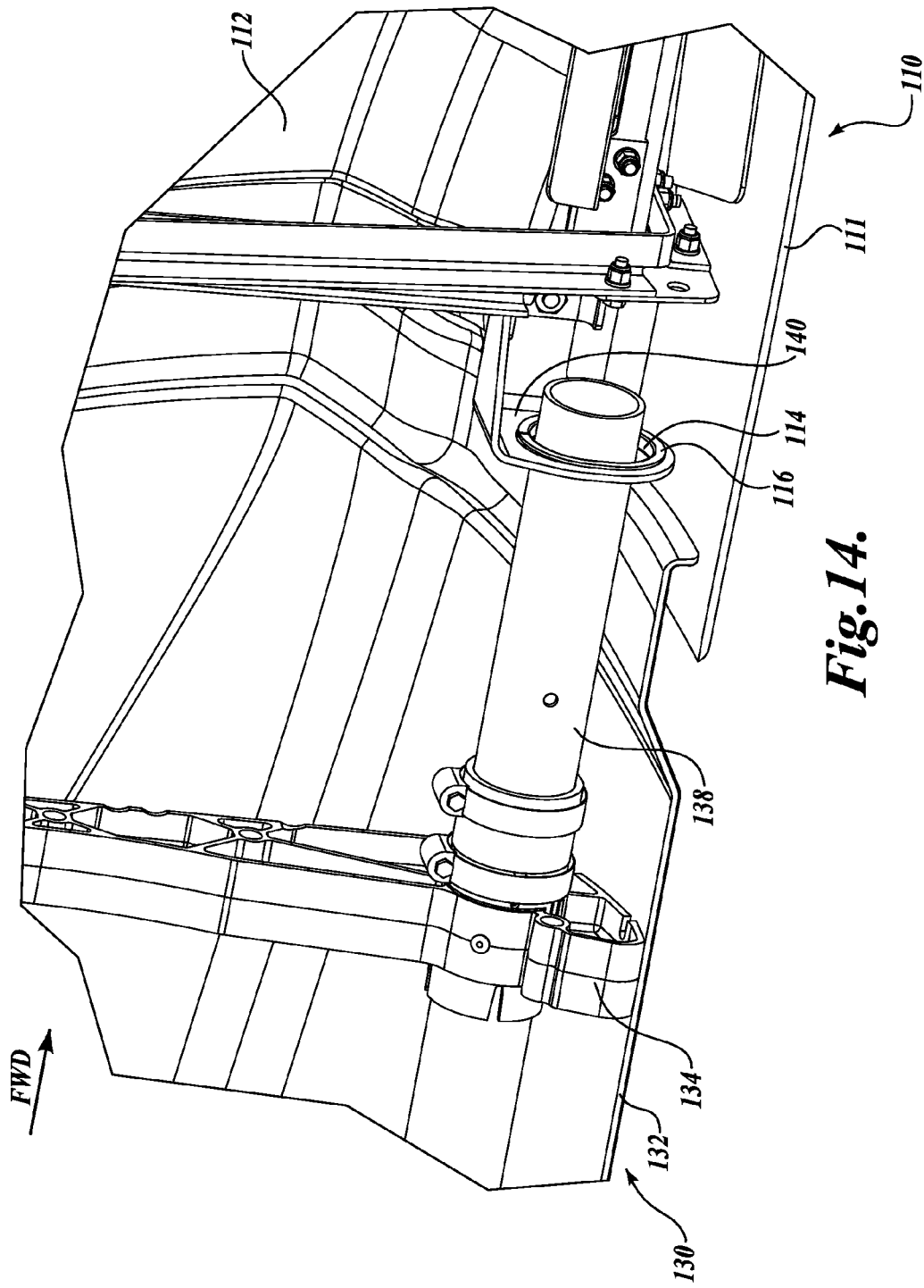
FIG. 14 is an inboard isometric view of the lower forward fairing attachment shown in FIG. 4.
Figure 15:
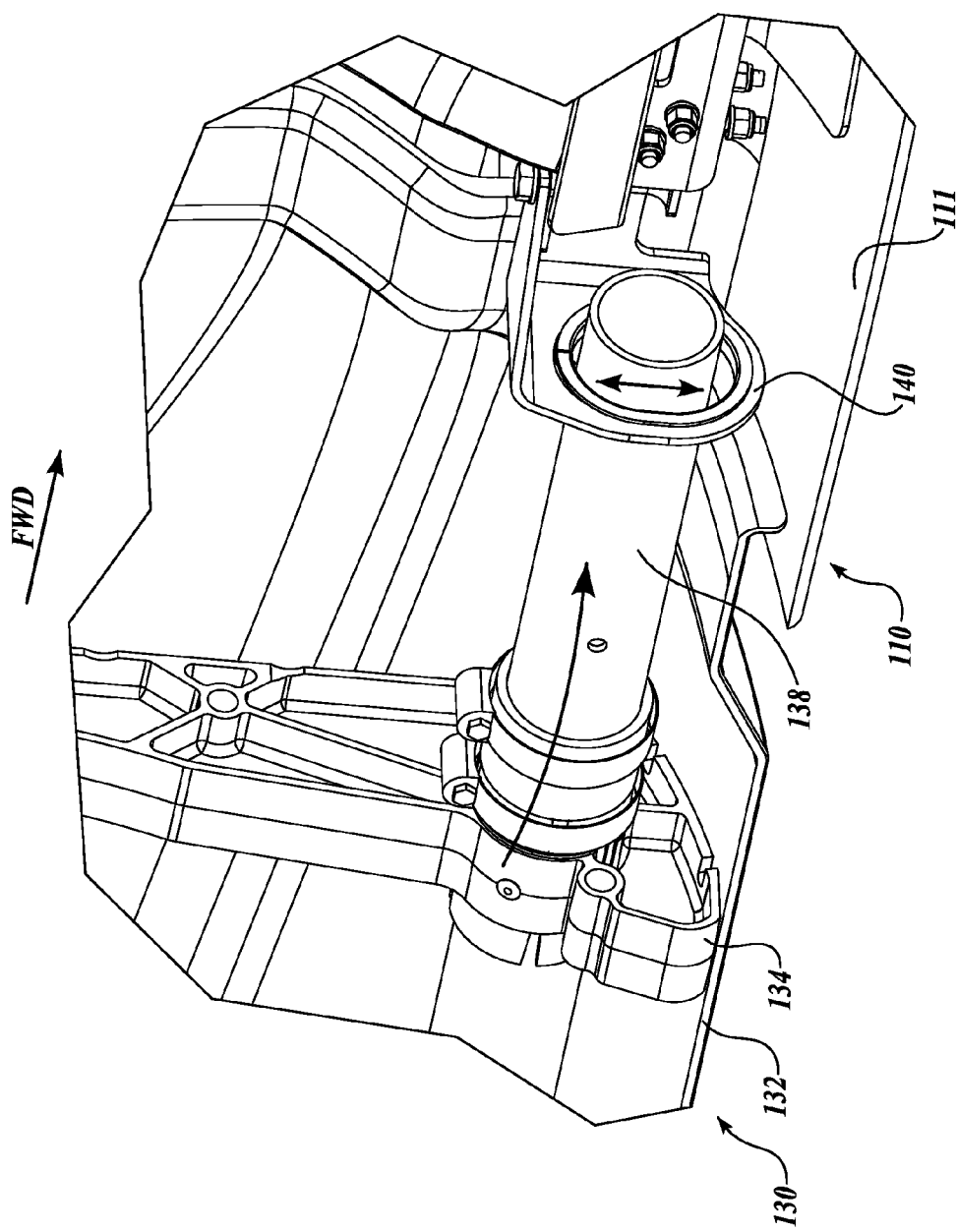
FIG. 15 is an inboard isometric view of the lower forward fairing attachment, shown in FIG. 14.

FIGS. 14 and 15 show the attachment of the forward end of the lower support tube 138 to the chassis support structure 140. A slotted hole 114 is located in the chassis support structure 140, and the forward end of the lower support tube 138 passes through the slotted hole 114. The slotted hole 114 is sized and positioned so that it limits movement of the forward end of the lower support tube 138 in the lateral direction, by not in the vertical direction or the forward/rearward direction. In addition, slotted hole 114 allows the lower support tube 138 to rotate freely about the central axis of the lower support tube 138. An optional grommet 116 is attached to the edge of the slotted hole 114 to reduce wear of the lower support tube 138 and the chassis support structure 140.

Figure 16:
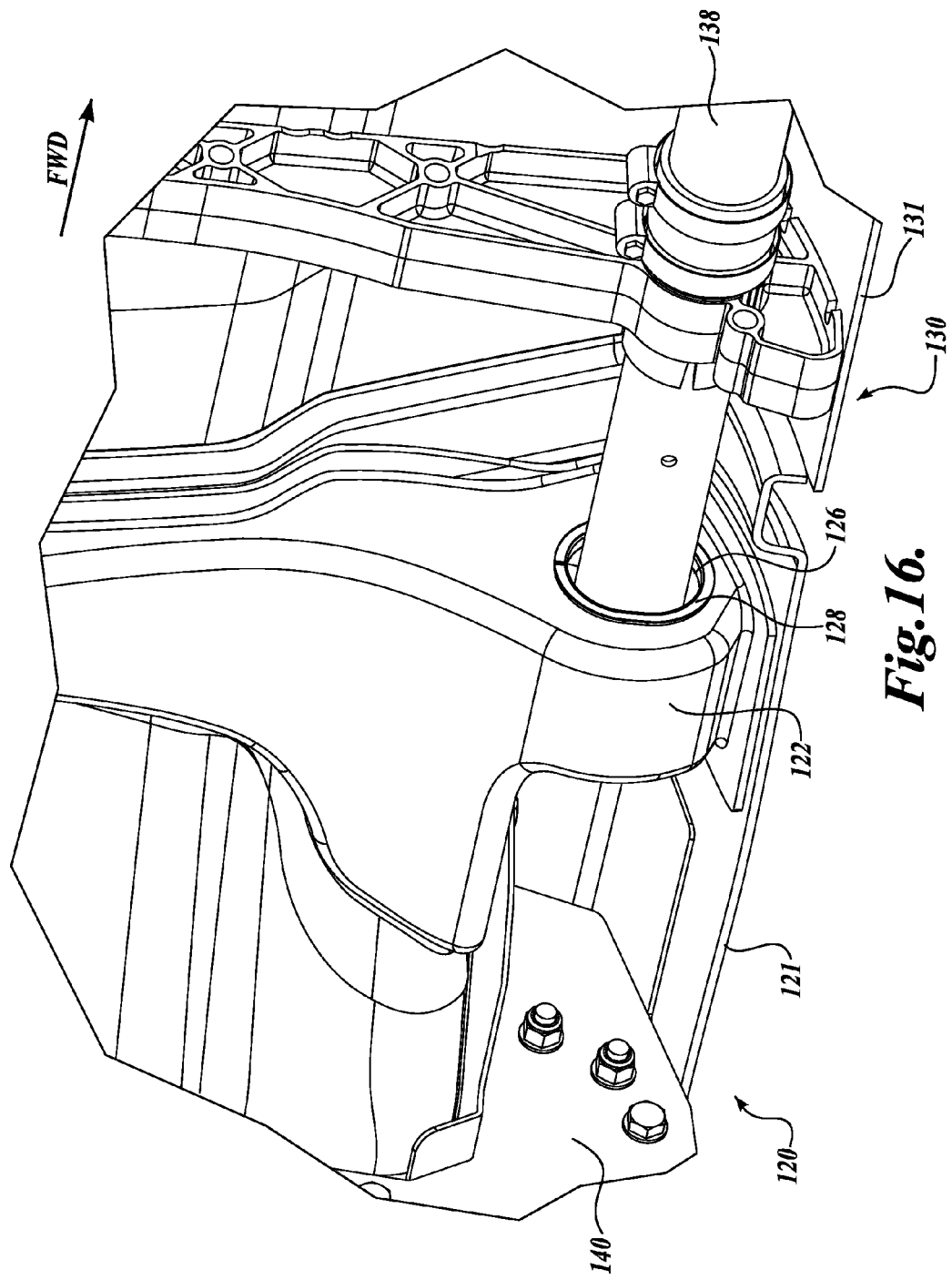
FIG. 16 is an inboard isometric view of the lower rear fairing attachment shown in FIG. 4.

FIG. 16 shows the attachment of the rear end of the lower support tube 138 to the rear fairing support 122. A slotted hole 126 is located in the rear fairing support 122 and supports the rear end of the lower support tube 138 in a manner similar to the slotted hole 114 in the chassis support structure 140 that supports the forward end of the lower support tube 138. The edge of slotted hole 126 in the rear fairing support 122 is optionally lined with a grommet 128 to prevent wear of the lower support tube 138 and the rear fairing support 122.

The attachment of the center fairing panel assembly 130 to the chassis support structure 140 and the rear fairing support 122 allows for a certain amount of flexibility at the individual support joints. As shown in FIGS. 17 and 18, the forward and rear compression members 170 flex slightly under normal operating loads, allowing the upper support tube 136 to translate in the forward and rearward directions, and also to rotate relative to the forward and rear fairing assemblies 110, 120. Because lower support tube 138 is supported at each end by a vertical slotted hole, the lower support tube 138 is free to move vertically or forward and aft. The lower support tube 138 is also free to rotate relative to the forward and rear fairing assemblies 110, 120. Because of the flexibility and degrees of freedom afforded by attachment of the center faring panel assembly 130, the center fairing panel assembly 130 can move relative to the forward and rear fairing assemblies 110, 120 when dynamic conditions occur during vehicle operation. For example, FIG. 18 shows the forward, center, and rear fairing assemblies 110, 130, 120 rotated relative to each other when dynamic conditions, such as the vehicle running over a pothole or a curb, temporarily twist the frame of the vehicle.

Figure 19:
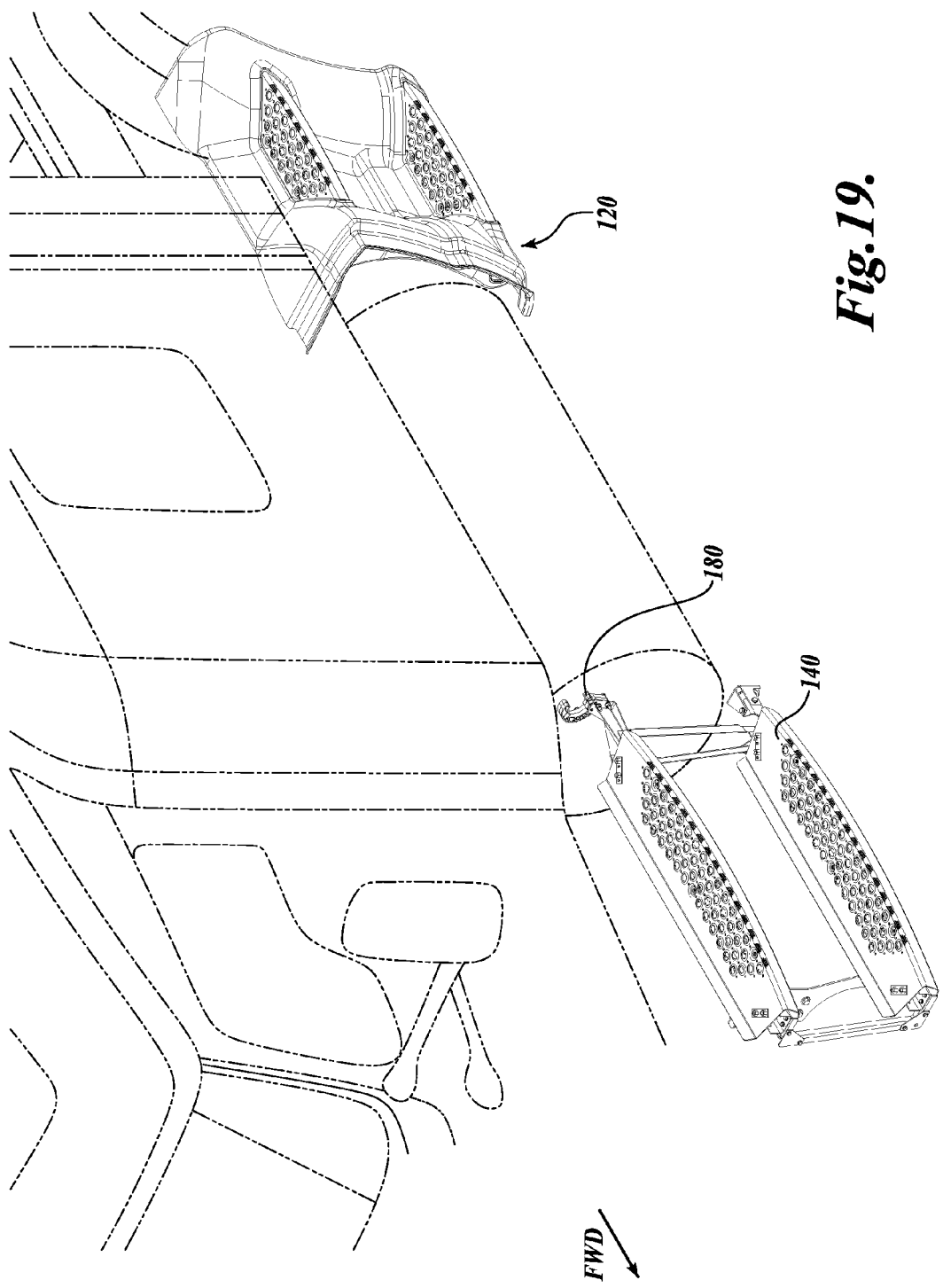
FIG. 19 is an outboard isometric view of the chassis fairing assembly shown in FIG. 1 with the forward fairing assembly and center fairing assembly removed.
Figure 20:
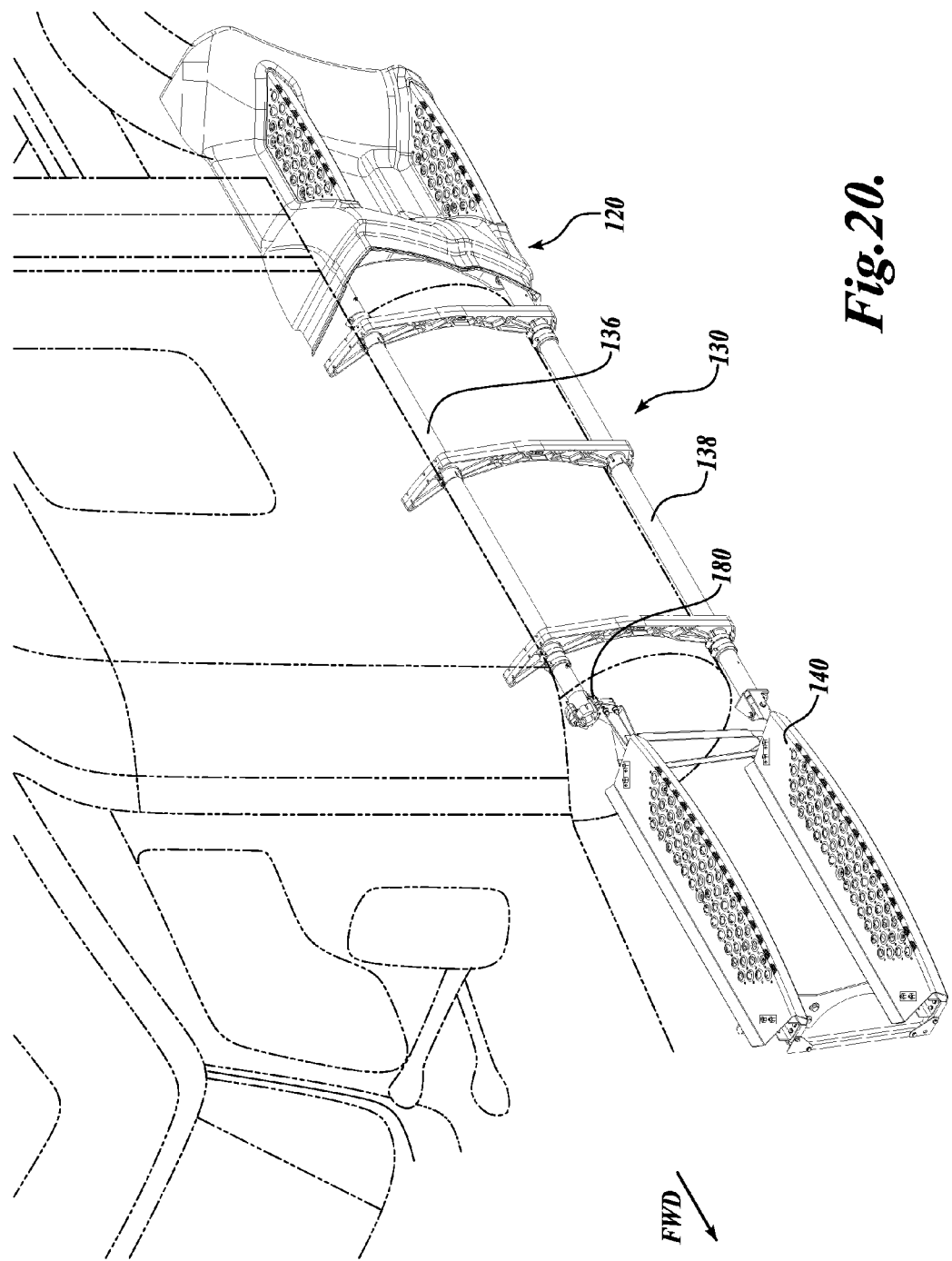
FIG. 20 is an outboard isometric view of the chassis fairing assembly shown in FIG. 1 with the forward fairing assembly and the center fairing skin removed.
Figure 21:
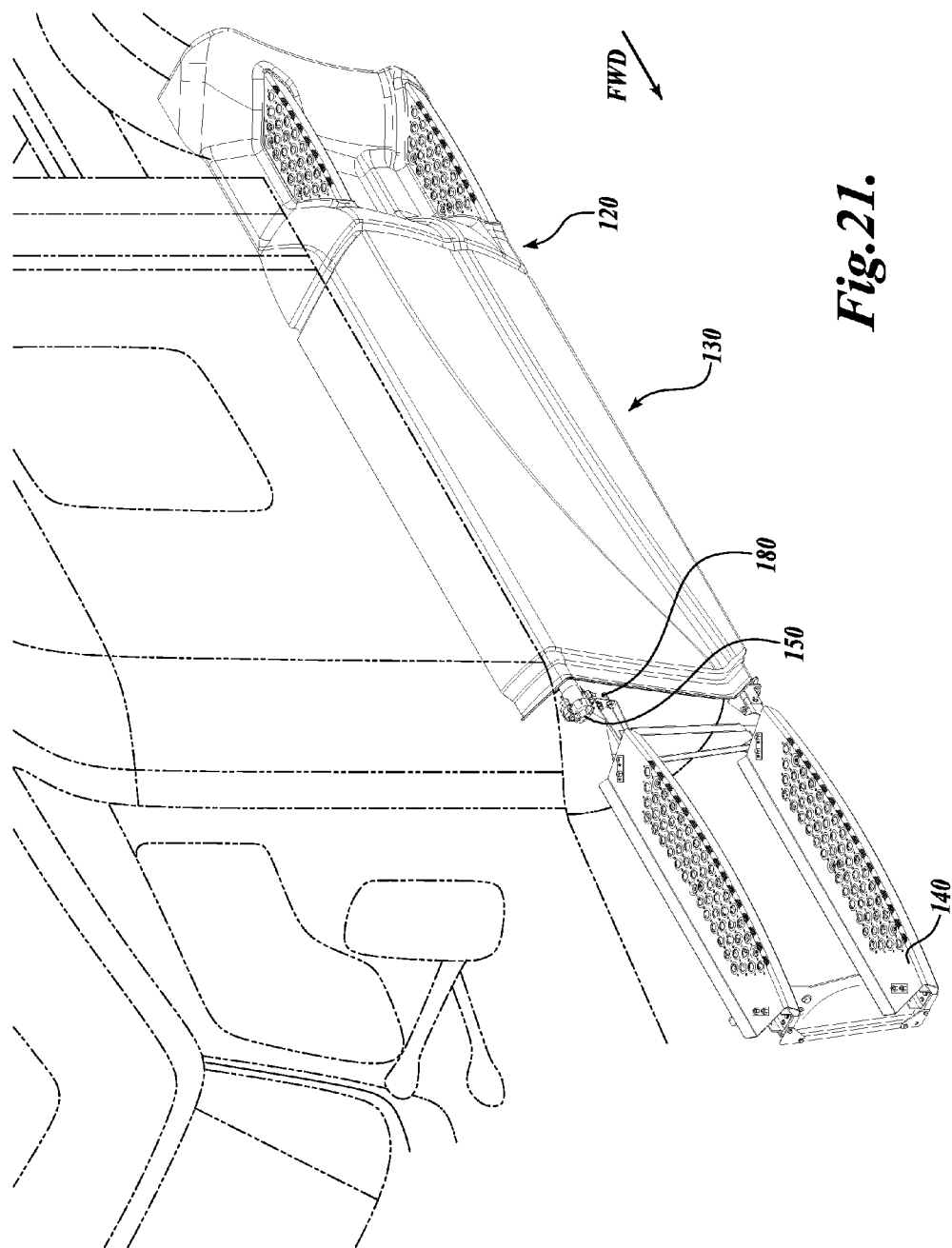
FIG. 21 is an outboard isometric view of the chassis fairing assembly shown in FIG. 1 with the forward fairing assembly removed.

FIGS. 19-21 illustrate the installation of the chassis fairing assembly 100. Referring to FIG. 19, the rear fairing assembly 120 is attached to the chassis support structure 140 by attaching the rear fairing support 122 to the chassis support structure 140. As shown in FIG. 20, the rear end of the upper support tube 136 slides into a first retainer fitting 150, which is secured in the aperture 160 of the rear fairing support 122 as previously described. At the same time, the rear end of the lower support tube 138 slides into the slotted hole 126 of the rear fairing support 122. The forward end of the lower support tube 138 is inserted into the slotted hole 114 in the chassis support structure 140, and the forward end of the upper support tube 136 is placed in the C-shaped portion of the support hook 180. A second retainer fitting 150 is inserted into the forward side of the support hook 180 so that it captures the forward end of the upper support tube 136. The second retainer fitting 150 is locked in place by rotating it so that the first and second protrusions 166, 168 engage the forward and rear sides, respectively, of the support hook 180. The compressive stresses in the compression members 170 equalize by translating the upper support member 136 forward or rearward, thereby ensuring that the center fairing assembly 130 is properly located.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fairing assembly demountably coupled to a vehicle, the fairing assembly comprising:
    (a) a first support structure secured to the vehicle;
    (b) second support structure secured to the vehicle;
    (c) a fairing skin;
    (d) a first support member, a first end of the first support member being coupled to the first support structure, a second end the first support member being coupled to the second support structure, wherein the first support member comprises an elongate tube secured to an upper portion of the fairing skin;
    (e) a first elastic compression member disposed between the first end of the first support member and the first support structure; and
    (f) a second elastic compression member disposed between the second end of the first support member and the second support structure, wherein the first and second compression members impart opposing forces on the first support member to position the first support member relative to the first and second support structures.

2. The fairing assembly of claim 1, wherein the first support structure comprises an aperture, the aperture rotatably engaging the first end of the first support member.

3. The fairing assembly of claim 1, wherein the second support structure comprises a support hook, the support hook rotatably engaging the second end of the first support member and having an opening to receive the second support structure from a lateral direction.

4. The fairing assembly of claim 1, further comprising a second support member, the second support member comprising an elongate tube fixedly secured to a lower portion of the fairing skin.

5. The fairing assembly of claim 4, wherein the first support structure comprises a first slot, the first slot slidably engaging a first end of the second support member.

6. The fairing assembly of claim 5, wherein the second support structure comprises a second slot, the second slot slidably engaging a second end of the second support member.

7. The fairing assembly of claim 1, further comprising a first end cap, the first end cap being attached to the first support structure and having an aperture, the first end of the first support member being disposed within the aperture of the first end cap.

8. The fairing assembly of claim 7, wherein the first compression member is disposed within the first end of the first support member such that the first compression member contacts an interior portion of the first end cap.

9. The fairing assembly of claim 1, further comprising a second end cap, the second end cap being attached to the second support structure and having an aperture, the second end of the first support member being disposed within the aperture of the second end cap.

10. The fairing assembly of claim 9, wherein the second compression member is disposed within the second end of the first support member such that the first compression member contacts an interior portion of the first end cap.

11. A fairing assembly capable of being demountably coupled to a first and second support structure, the fairing assembly comprising:
    (a) a fairing skin;
    (b) a first support member having a first end and a second end, the first end being capable of coupling to the first support structure, the second end being capable of coupling to the second support structure, wherein the first support member comprises an elongate tube secured to an upper portion of the fairing skin;
    (c) a first elastic compression member associated with the first end of the first support member such that the first elastic compression member is disposed between the first support member and the first support structure when the first support member is coupled to the first support structure; and
    (d) a second elastic compression member associated with the second end of the first support member such that the second elastic compression member is disposed between the first support member and the second support structure when the first support member is coupled to the second support structure, wherein the first and second compression members are adapted to impart opposing forces on the first support member to position the first support member relative to the first and second support structures when the first support member is coupled to the first and second support structures.

12. The fairing assembly of claim 11, further comprising a second support member, the second support member comprising an elongate tube secured to a lower portion of the fairing kin.

13. The fairing assembly of claim 11, further comprising a first end cap, the first end cap being capable of engaging the first support structure and having an aperture for receiving the first end of the first support member.

14. The fairing assembly of claim 13, wherein the first compression member is disposed within the first end of the first support member such that the first compression member contacts an interior portion of the first end cap when the first end of the first support member is received by the aperture of the first end cap.

15. The fairing assembly of claim 11, further comprising a second end cap, the second end cap being capable of engaging the second support structure and having an aperture for receiving the second end of the first support member.

16. The fairing assembly of claim 15, wherein the second compression member is disposed within the second end of the first support member such that the second compression member contacts an interior portion of the second end cap when the second end of the first support member is received by the aperture of the second end cap.

* * * * *

UNITED STATES PATENT AND TRADEMARK OFFICE
CERTIFICATE OF CORRECTION

PATENT NO. : 7,641,254 B2  Page 1 of 1
APPLICATION NO. : 12/024907
DATED : January 5, 2010
INVENTOR(S) : P. Stegawski et al.

It is certified that error appears in the above-identified patent and that said Letters Patent is hereby corrected as shown below:

| COLUMN | LINE | ERROR |
|---|---|---|
| 9 | 13 | "kin." should read --skin.-- |

Signed and Sealed this
Seventeenth Day of July, 2012

David J. Kappos
*Director of the United States Patent and Trademark Office*